United States Patent [19]
Mitchell

[11] Patent Number: 5,091,791
[45] Date of Patent: Feb. 25, 1992

[54] PORTABLE VIDEO-PHOTO MACHINE
[76] Inventor: Charles E. Mitchell, 64 Union Ave., Upper Saddle River, N.J. 07458
[21] Appl. No.: 581,724
[22] Filed: Sep. 12, 1990
[51] Int. Cl.⁵ .............................. H04N 1/40
[52] U.S. Cl. .................... 358/479; 358/229; 358/254; 358/909
[58] Field of Search ............ 358/479, 229, 254, 909, 358/248, 249, 93

[56] References Cited
U.S. PATENT DOCUMENTS

| 4,130,834 | 12/1978 | Mender | 358/134 |
| 4,258,387 | 3/1981 | Lemelson | 358/229 |
| 4,302,776 | 11/1981 | Taylor | 358/909 |
| 4,576,578 | 3/1986 | Parker | 358/254 |
| 4,719,513 | 1/1988 | Peterson | 358/254 |
| 4,916,550 | 4/1990 | Miyake | 358/229 |

Primary Examiner—Victor R. Kostak
Assistant Examiner—Sherrie Hsia

[57] ABSTRACT

A portable video-photo machine for permitting a person being photographed to see how he or she will appear the photograph prior to the printing thereof. The machine comprises a collapsible housing having a video camara, video monitor, a still-frame apparatus, and photograph printing device associated therewith. The machine also comprises transporting means and a stand alone power source to facillitate its portability.

9 Claims, 3 Drawing Sheets

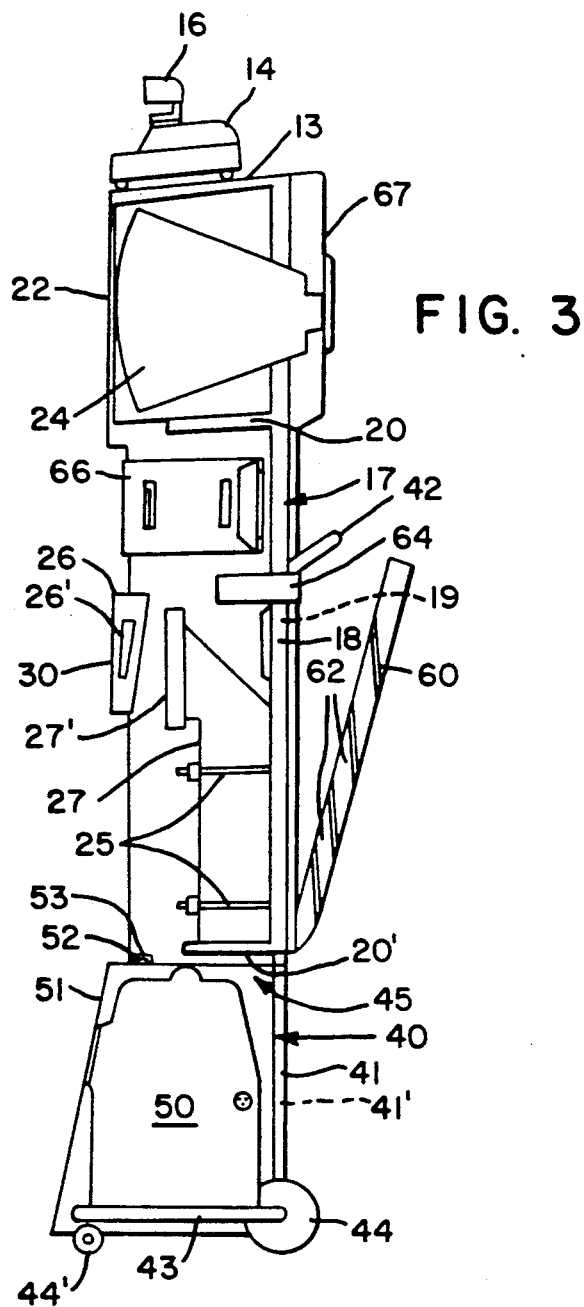
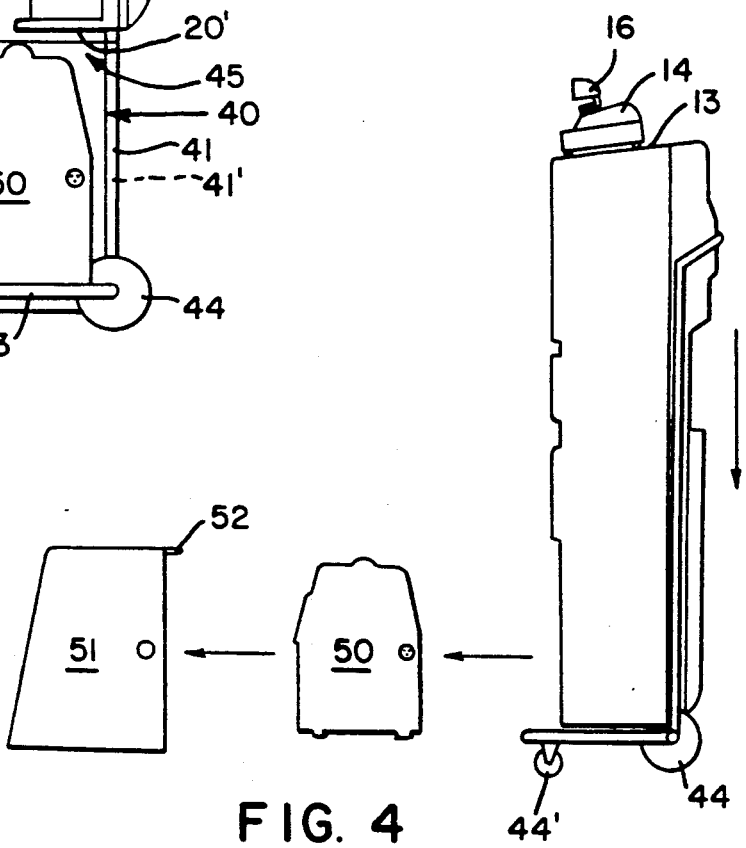
FIG. 3
FIG. 4

PORTABLE VIDEO-PHOTO MACHINE

In the photography industry, there have been many improvements over the years in the area of instant film development. Typically, a person can be photographed and, within a few minutes, see the exposed film developed before his or her sight. The problem is that sometimes the photographed person is unhappy with the way he or she appears on the developed photo since either the photographer "snapped" the picture before the person was ready, or their pose did not appear the way they thought it would.

In an attempt to address this problem, the photographer usually takes a series of photographs of the subject from which the subject may choose a print that he or she considers best.

SUMMARY OF THE INVENTION

It is the object of this invention to provide a remedy to the above noted problem by providing a photography system, whereby a subject can see how he or she will appear on a photograph prior to the printing thereof. This objective will be accomplished through the use of "still-frame" photography, wherein a video image of a subject can be "frozen" or captured and subsequentently viewed by the subject prior to producing a print thereof.

It is a further object of this invention to provide a compact and portable housing for the instant photography system.

DESCRIPTION OF THE DRAWINGS

FIG. 3 is a cross-sectional view of the instant invention.

FIG. 4 shows the process for collapsing the instant invention.

BRIEF DESCRIPTION OF THE PREFERRED EMBODIMENTS

Figure 1:
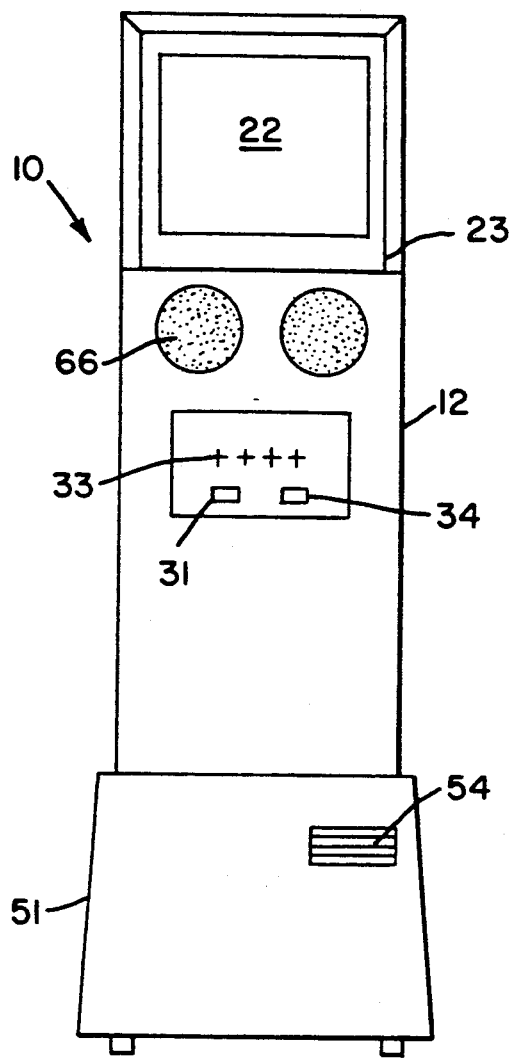
FIG. 1 is a frontal view of the instant invention.
Figure 2:
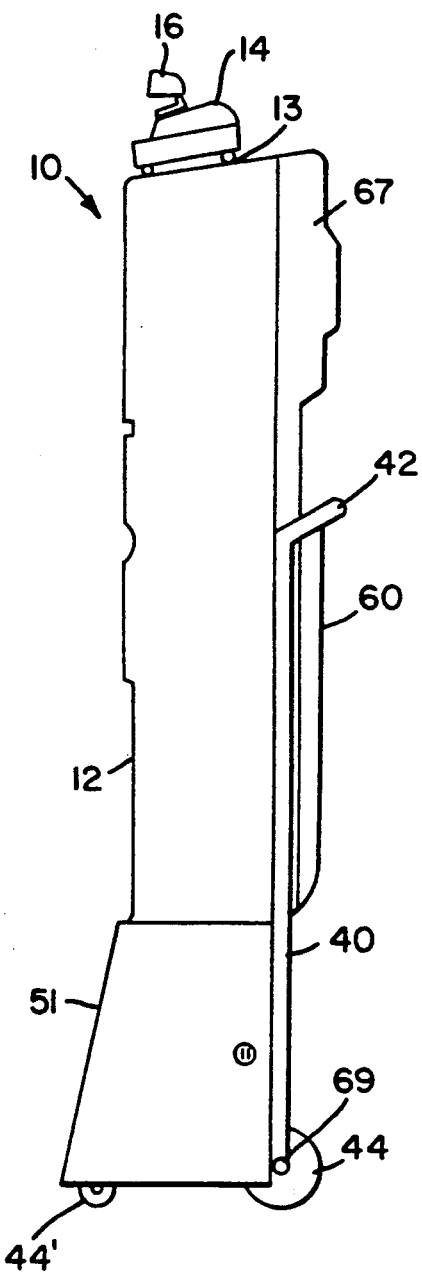
FIG. 2 is a profile view of the instant invention.

The video-photo machine comprising the instant invention is generally shown in FIG. 1 as numeral (10). An elongated housing (12) of a generally upright cylindrical construction constitutes the main body portion of the machine. A conventional video camera (14), such as a Camcorder, or the like, is mounted on the upper surface (13) of housing (12) for creating a video image of the subject. The camera (14) may also have attached thereto a light source (16) for illuminating the subject in low-light situations.

In FIG. 3, a cross-sectional view of the instant invention is shown, wherein the internal components of the instant invention can be seen mounted upon a vertical support frame (17). Said support frame comprises a pair of spaced parallel elongated L-shaped members (18) and (19) (of which only (18) is visible) vertically mounted in said housing, with each member (18) and (19) having upper and lower transverse projection arms (20) and (20') attached thereto.

Figure 5:
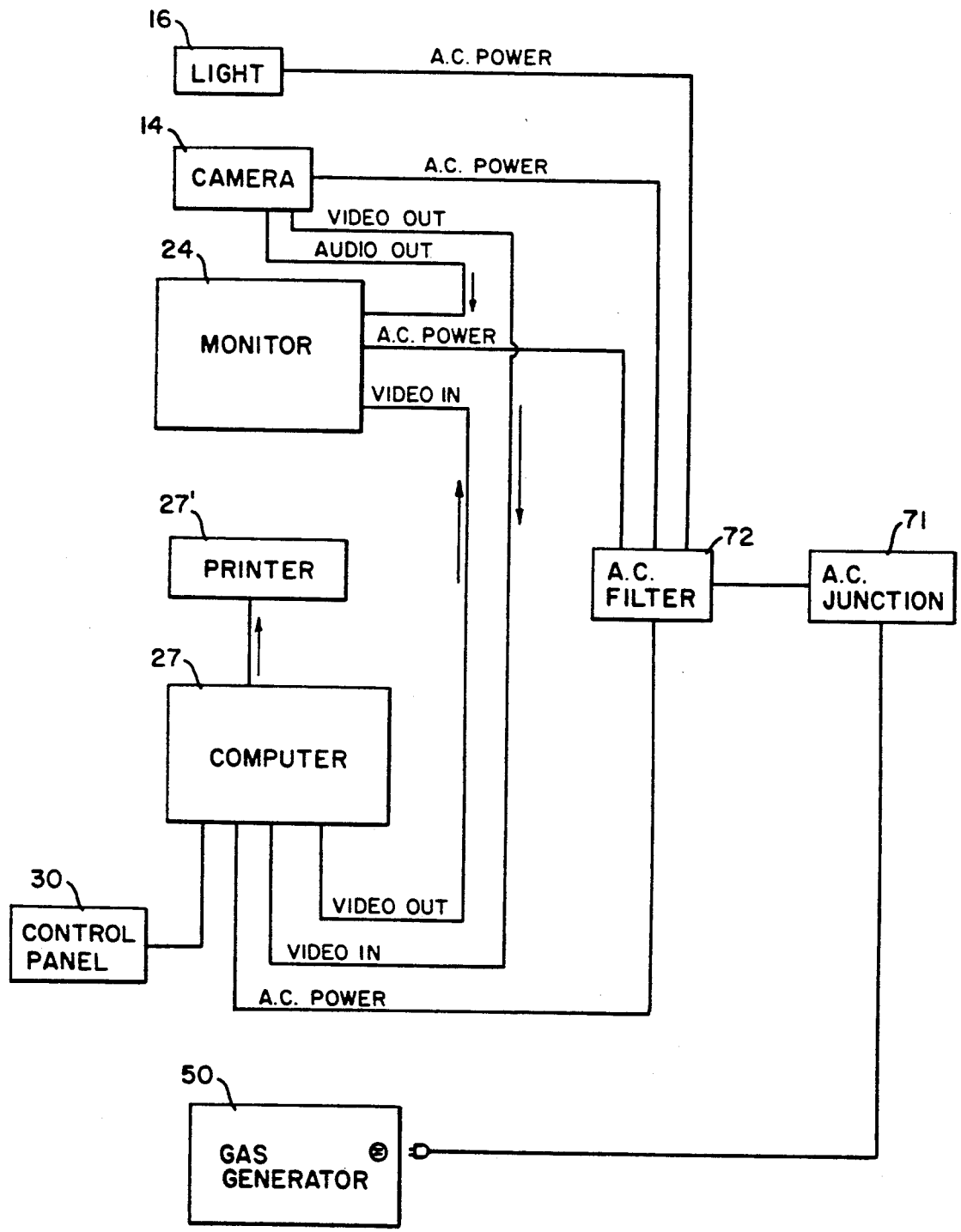
FIG. 5 is an electrical schematic of the video-photo system comprising the instant invention.

Turning now to FIG. 5 along with FIG. 3, mounted in the upper-most interior region of said housing (12) on the upper transverse support arms (20) is a video monitor (24) for displaying on screen (22) the video image created by said camera (14). Said screen (22) is viewable by the subject via a contiguous cut-out (23) in said housing (12. Below said monitor (24) and mounted on the lower transverse support arms (20'), via fasteners (25) is a still-frame apparatus (27). Said still-frame apparatus (27) comprises a computer having a memory for capturing and storing a selected one of the frames constituting said video image as controllably displayed on the screen (22). A front access door (26) is hingedly attached to the housing (12) adjacent the photo printing unit (27') of the still-frame apparatus. Mounted in a recess in the access door (26) is a control panel (30) comprising means (31) for freezing the video image, and (33) for setting the contrast, sharpness, color, tint, etc. of the image prior to the printing thereof via print button (34).

To provide for the portability of said machine, a hand truck (40) is employed which comprises a pair of upright parallel vertical frame members (41) and (41') (of which only (41) is visible) adjoined by a horizontal offset handle portion (42) at their upper ends, and a horizontal platform surface (43) at the opposite lower ends. A first pair of wheels (44) are rotatably connected to an axel (69) that extends through the verticle frame members (41) and (41'), while a second pair of coaster wheels (44') are pivotally and rotatably connected to the free distal end of said platform surface (43). The hand truck frame is slidably attached to the support frame (17) via a plurality of U-shaped brackets that encircle the respective adjacent hand truck frame members (41,41') and the L-shaped support frame members (18) and (19). A horizontal support brace (45) is attached between the verticle frames (41) (41') beneath the housing (12) for supporting the housing (12) a spaced distance above the platform surface (43).

For the outdoor operation of said machine, a gasoline powered generator (50) may be optionally situated on the platform surface (43) in the space beneath housing (12). As schematically shown in FIG. 5, said generator (50) provides an electrical source of power to the electrical components via an alternating current (A.C.) junction (71) and filter (72). A housing shroud (51) encloses the generator (50) and is connected to the housing (12) via tabs (52) insertable into corresponding openings (53) in said housing (12). (Only one mating tab and opening is shown in FIG. 3.) A vent opening (54) is also located in the frontal surface of said shroud for ventillating exhaust fumes from said generator (50).

On the reverse side of housing (12), a rear access door (60) is pivotally attached. Said rear access door (60) has a rectangular shape with the long sides thereof extending parallel to the longitudinal axis of the housing and the lower short side thereof providing said pivotal attachment to the housing (12). Inclined storage trays (62) are provided on the interior wall of said rear access door (60) for storing picture frames, films, and the like materials.

Also mounted on the rear of the housing (12) is a covering (67) for the rear of the monitor (24). The covering (67) is shaped to conform to the rearwardly projecting components of the monitor (24).

Optionally, a cassette player (64) and speaker system (66) may be installed in the housing (12) to provide "mood music" for the person being photographed.

The overall height of the machine may be reduced to make it more compact by first removing the shroud (51) and generator (50), then removing the horizontal brace (45) to permit the support frame members (18) and (19) to slide along the hand truck frames (41) and (41') until the bottom of said housing (12) rests upon the platform surface (43).

In operation, the machine is in its erected position while the photographer focuses camera (14) on a subject posing in front thereof. The video images created by the camera (14) are seen in real time on screen (22) of monitor (24) by the subject and photographer. The photographer activates the freeze/release button (31) on control panel (30) and the still-frame apparatus (27) causes a selected one of the video image frames to appear frozen on the screen (22). The subject may then indicate whether or not the frozen image is to his or her liking. If the subject is unhappy, with his or her appearance, the frozen image is released by again activating the button (31) and the process repeated. Once the subject selects a frozen image or still-frame that is desirable, the photographer activates print button (34) to cause the photo printing unit (27') of the still-frame apparatus (27) to print a copy thereof. The exposed print egresses the machine via an opening (26') in said front access door (26).

The above description of the instant invention does not preclude or restrict any obvious deviations thereof.

Having thus described my invention I claim:

1. A portable, self contained video-photo machine for readily producing a photograph of a subject from a captured video image thereof, said video-photo machine comprising;

an elongated upright, generally cylindrical housing;
   a video camera for creating real time video images of the subject mounted on the uppermost—horizontal exterior surface of said housing, said video camera having a video output terminal;
   a monitor having a screen for displaying said real time video images mounted within said housing, said screen being viewable through an opening in the frontal surface of said housing, and said monitor further having a video input terminal;
   a still-frame apparatus for "freezing" a selected one frame of said video images and controlling the display thereof on said monitor, said still-frame apparatus having video input and output terminals for connecting said still-frame apparatus intermidate said camera and monitor via the respective video output and input terminals of said camera and monitor; said still-frame apparatus comprising a computer having a memory for capturing and storing said selected one "frozen" video image;
   photo printing means integrally formed with said still-frame apparatus for readily producing a hard copy photograph of said selected one "frozen" video image;
   a frontal access door pivotally connected to said housing beneath said monitor and adjacent to said photo printing means to provide access to said photo printing means for loading the same with film for producing said photograph; said frontal access door further including an elongated opening therein for permitting the egress of said photograph from said printing means and the presentation thereof to an operator;
   a control panel electrically connected to said still-frame apparatus and mounted in a recess in said frontal access door; said control panel having actuation means for selectively providing said "freezing" of one of the video images;
   means for providing a source of power for said video camera, monitor, and still-frame printing apparatus; and
   means for facilitating the transport of the machine as a unit comprising: a hand truck having a platform surface, an upright frame member transversely connected to said platform surface at its lower end with handle means provided at its upper end, and wheel means connected to said platform and upright frame member;
   said hand truck being independently connected to said housing with all of the components comprising said video-photo machine either contained in or connected to said housing.

2. The video-photo machine according to claim 1, wherein said housing has an elongated support frame contained therein; said frame having an upper pair of transversely projecting arms for supporting said monitor, and a lower pair of transversely projecting arms for supporting said still-frame printing apparatus; the portion of said support frame intermediate said upper and lower projecting arms being slidably connected to said hand truck upright frame member, whereby the overall height of the machine can be reduced by moving said hand truck from an extended to a retracted position wherein the bottom of said housing rests upon the upper surface of said hand truck platform.

3. The photo-video machine according to claim 2, wherein said source of power is a gasoline generator positioned on the upper surface of said hand truck platform; said photo-video machine further comprising:
   a detachable shroud connected to the lower end of said housing for surrounding said generator and for maintaining said housing in a raised position relative to said hand truck platform, whereby said reduction in the overall height of said machine is accomplished by first removing said shroud and generator and thereafter permitting said housing to be displaced downward until the housing bottom rests upon said hand truck platform; said shroud further having an opening therein for ventilating exhaust fumes from said generator while the machine is in use in said raised position.

4. The video-photo machine according to claim 3, further comprising audio means mounted in said housing for providing "mood music" for the subject being photographed.

5. The video-photo machine according to claim 4, wherein said audio means comprises a cassette player or the like and a speaker system.

6. The video-photo machine according to claim 1, wherein said housing has attached thereto a covering for the rear of said monitor, the shape of said covering protruding to conform to the rearwardly projecting shape of said monitor.

7. The video-photo machine according to claim 5, wherein the rear of said housing has pivotally attached thereto an elongated rear access door having inclined storage shelves formed in the interior wall for the storage of said film.

8. A portable housing assembly for a video-photo system, wherein said system comprises a video camera, monitor, still-frame apparatus, photo-printing unit, control means, and power supply; said housing assembly comprising:

an elongated cylindrical body member of a generally upright configuration; an opening in the frontal surface of said body member for viewing said monitor;

a frontal access door pivotally connected to the frontal surface of said body member for permitting access to said printing unit and for supporting said control means;

an elongated support frame member mounted to and contained in said body member; said frame member comprising an upper pair of transversely projecting arms for supporting said monitor and a lower pair of transversely projecting arms for supporting said still-frame apparatus and photo-printing unit; said support frame having a pair of vertical arms extending intermediate said upper and lower transversely projecting arms;

means for transporting said housing including a hand truck comprising a platform, a pair of upright frame member transversely connected to said platform, and wheel means respectfully attached to said hand truck upright frame and platform; said hand truck upright frame being slidably connected to said pair of vertical arms of said support frame for displacing said body member relative to said hand truck; and said platform providing a support for said power supply, while the rest of the components comprising said video system are either connected to or contained in said body member;

a shroud detachably connected to the lower end of said body member for surrounding said power supply and for maintaining said body member in a raised position spaced above said hand truck platform;

the overall height of said housing assembly being reduced by removing said shroud and permitting said support frame intermediate vertical arms to slide along said hand truck upright frame members until the bottom of the body member rests upon said platform.

9. The portable housing assembly according to claim 8, wherein an audio system is supported by said support frame within said body member.

* * * * *